Figure 1:
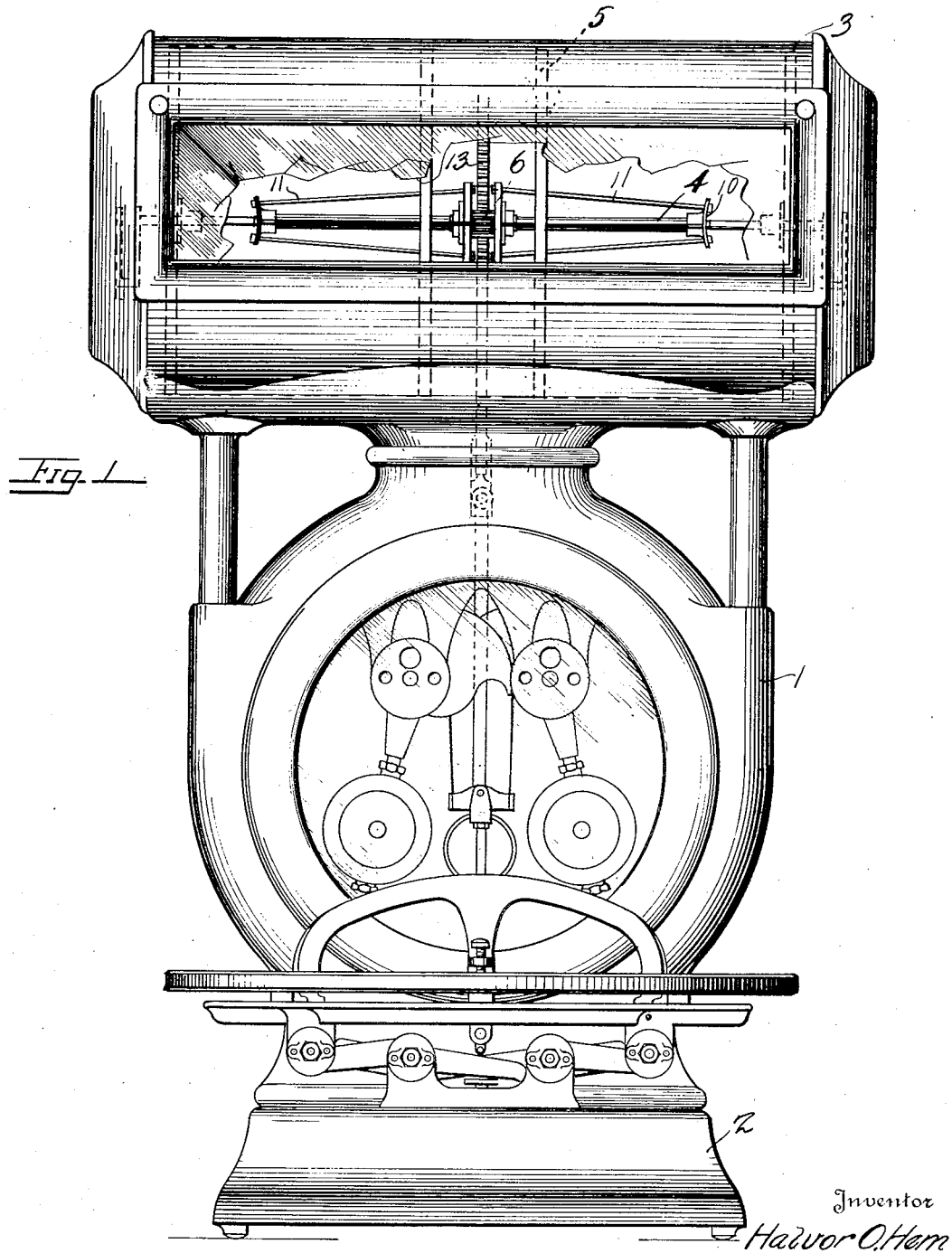

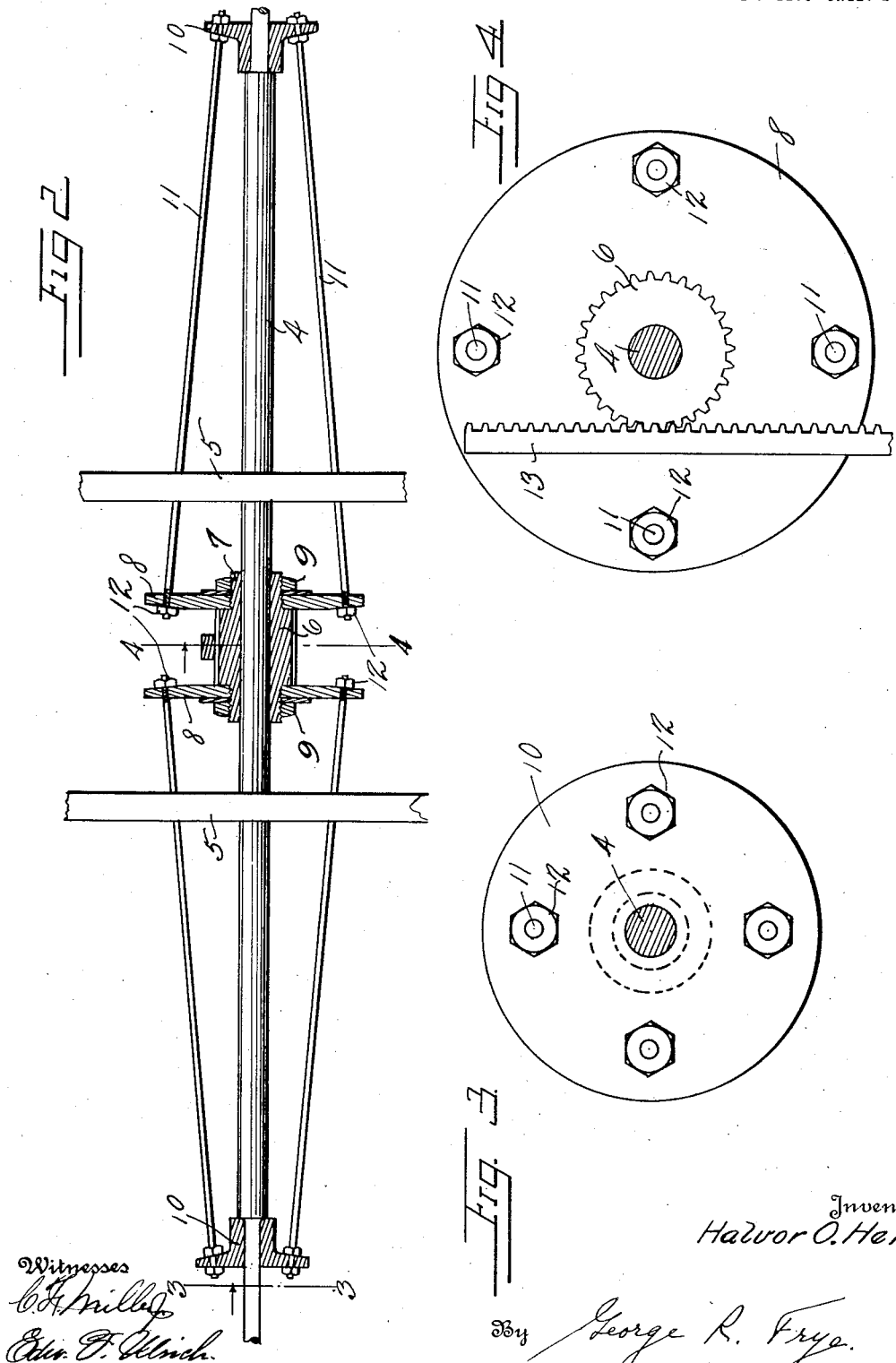

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

SHAFT FOR CYLINDER-SCALES.

1,285,164.  Specification of Letters Patent.  Patented Nov. 19, 1918.

Application filed December 21, 1916. Serial No. 138,200.

*To all whom it may concern:*

Be it known that I, HALVOR O. HEM, a citizen of the United States, residing at Toledo, in the county of Lucas and State of Ohio, have invented certain new and useful Improvements in Shafts for Cylinder-Scales, of which the following is a specification.

This invention relates to weighing scales, and more particularly to scales embodying a cylinder bearing thereon the weight and value graduations. It has been found in practice that whenever the cylinder is of appreciable length, the shaft thereof is liable to become distorted by springing or warping, etc., whenever the scale is exposed to the varying temperatures met with in stores, factories, and the like. This effect is heightened because of the fact that rotative stresses are exerted upon certain portions of the shaft from the weighing mechanism of the scale, while other portions thereof oppose these stresses because of their being mounted in bearings at a distance from the point of application of the rotative stresses. This is particularly true when the pinion whereby the cylinder is driven is located centrally of the shaft and the shaft is made of such length that it is advisable for purposes of economy and convenience to make the chart-bearing periphery of the cylinder in sections.

The primary object of the present invention is to overcome the above-mentioned defects of cylinder scales by providing a construction whereby the cylinder shaft is so supported and arranged as to maintain it in true longitudinal alinement and whereby it may be restored to longitudinal alinement should it for any reason become warped, sprung, or otherwise distorted.

With these and other objects in view, my invention resides in the arrangement, combination and assemblage of elements illustrated in the accompanying drawings and particularly pointed out in the subjoined claims.

In the drawings:—

Figure 1 is a front elevation of a cylinder scale equipped with my invention; Fig. 2 is an enlarged plan view of the cylinder shaft with the associated elements thereof shown in section; Fig. 3 is a detail sectional view taken on the line 3—3 of Fig. 2; and Fig. 4 is a similar view taken on the line 4—4 of Fig. 2.

Referring to the drawings, the numeral 1 designates a housing mounted upon a suitable base 2 and supporting upon its upper end a cylindrical casing 3 having forward and rear reading openings therein, in the usual manner, the forward reading opening being elongated and extending substantially across the entire cylinder. The cylinder shaft 4 is rotatably mounted upon suitable anti-friction bearings within the casing 3, and carries adjacent its ends a pair of chart drums 5 upon which are marked the weight and value graduations in the customary manner. A pinion 6 is mounted upon the shaft, preferably centrally thereof, and is formed with reduced hubs 7 screw-threaded to receive disks 8 and retaining elements 9, such as lock nuts and washers. The nuts are tightened sufficiently to bind the disks 8 against the shouldered central portion of the pinion, so that the pinion and disks may be regarded as one composite member. Flanged collars 10 are positioned upon the shaft 4 in spaced relation to the disks 8 and are secured thereon by any suitable means. Preferably, shoulders are formed on the shaft 4 adjacent its ends and the ends of the shaft reduced, substantially as shown in Fig. 2. The adjacent disks 8 and collar 10 on the same side of the pinion are joined by connecting rods 11 circumferentially spaced around the two members, the rods being suitably secured to one of the members and adjustably connected with the other, as by means of the adjusting nuts 12 upon the screw-threaded ends of the rods, so that by turning the nuts 12 pressure can be exerted upon the disk and collar to restore the shaft to true vertical alinement and maintain it in such alinement.

Any suitable weighing mechanism may be employed in connection with my improved cylinder, and I have merely shown one form of weighing mechanism that has been found in practice to be efficient and which is illustrated and described in my co-pending application, Ser. No. 127,256, filed October 23, 1916. Likewise, any suitable platform and platform supporting lever mechanism may be employed, the invention disclosed herein being adaptable for use with many kinds of such mechanisms.

The cylinder shaft and pinion are adapted to be rotated by means of a vertically-disposed rack 13 connected with and actuated from the weighing mechanism, the cylinder being rotated through a sufficient arc upon movement of the weighing mechanism to indicate in connection with a fixed reading line the weight of a commodity placed upon the scale platform.

From the foregoing it will be noted that when the various elements of my improved cylinder are arranged and assembled upon the shaft 4 in the manner shown in Figs. 1 and 2 and hereinbefore described, the circumferentially-spaced rods will resist any tendency of the shaft to become distorted, the rod on one side being put under tension and the rod on the opposite side under compression whenever the shaft tends to spring or warp. Moreover, should the shaft 4 become distorted despite the strengthening rods, it may be immediately restored to true longitudinal alinement by tightening the proper nuts 12 to exert a pressure upon the rod in opposition to the warped portion thereof and tending to force that portion of the shaft in to the position desired—i. e., return it to its true longitudinal alinement with the remainder of the shaft.

While it will be apparent that the illustrated embodiment of my invention herein disclosed is well calculated to adequately fulfil the objects and advantages primarily stated, it is to be understood that the invention is susceptible to modification, variation and change without departing from the spirit and scope of the invention as set forth in the subjoined claims.

Having described my invention, I claim:

1. In a weighing scale, a cylinder having a shaft carrying spaced disks and circumferentially-spaced strengthening elements connecting the disks to maintain the shaft in true longitudinal alinement.

2. In a weighing scale, a cylinder having a shaft provided with a pinion thereon, and means arranged on the shaft in juxtaposition to the pinion and adjacent the ends of the shaft for maintaining the shaft in true longitudinal alinement.

3. In a weighing scale, a cylinder having a shaft provided with a pinion substantially centrally thereof, and strengthening elements arranged in connected pairs and mounted on the shaft on opposite sides of the pinion to maintain the shaft in true vertical alinement and to restore the shaft to alinement when distorted.

4. In a weighing scale, a cylinder having a shaft provided with a pinion thereon, a pair of disks of greater diameter than the pinion arranged adjacent the pinion, elements secured on the shaft in spaced relation to said disks, and a plurality of circumferentially-spaced rods connecting the disks and elements.

5. In a weighing scale, a cylinder having a shaft provided with a pinion thereon, and means for maintaining the shaft in true vertical alinement comprising spaced elements secured to said shaft and connected by a plurality of circumferentially-spaced adjustable rods.

6. In a weighing scale, a cylinder having a shaft provided with a pinion substantially centrally thereof, and means for maintaining the shaft in true vertical alinement comprising spaced elements secured to said shaft on opposite sides of the pinion and connected by a plurality of circumferentially-spaced adjustable rods.

7. In a weighing scale, a cylinder having a shaft provided with a pinion substantially centrally thereof, and means for maintaining the shaft in true vertical alinement comprising a pair of spaced disks secured adjacent the pinion, a pair of disks secured adjacent the ends of the shafts and circumferentially spaced adjustable rods connecting the disks on each side of the pinion.

8. In a weighing scale, a cylinder having a shaft provided with a pinion substantially centrally thereof, and means for maintaining the shaft in true vertical alinement comprising a pair of spaced disks secured adjacent the pinion, a pair of disks mounted on the shaft adjacent its ends, shoulders on the shafts against which the latter disks abut, and circumferentially spaced adjustable rods connecting the disks on each side of the pinion.

HALVOR O. HEM.

Witnesses:
C. F. MILLER, Jr.,
EDW. F. ULRICH.